(12) United States Patent
Ogawa et al.

(10) Patent No.: US 7,247,366 B2
(45) Date of Patent: Jul. 24, 2007

(54) MASKING MATERIAL

(75) Inventors: Masanori Ogawa, Aichi (JP); Kuninori Ito, Aichi (JP)

(73) Assignee: Nagoya Oilchemical, Co., Ltd., Aichi (JP)

( * ) Notice: Subject to any disclaimer, the term of this patent is extended or adjusted under 35 U.S.C. 154(b) by 0 days.

(21) Appl. No.: 10/399,078

(22) PCT Filed: Oct. 4, 2001

(86) PCT No.: PCT/JP01/08771

§ 371 (c)(1),
(2), (4) Date: Apr. 11, 2003

(87) PCT Pub. No.: WO02/30580

PCT Pub. Date: Apr. 18, 2002

(65) Prior Publication Data

US 2004/0096684 A1    May 20, 2004

(51) Int. Cl.
*B32B 27/04* (2006.01)
*B32B 27/08* (2006.01)

(52) U.S. Cl. ............ 428/220; 428/41.5; 428/174; 428/220; 428/343; 428/355; 525/92 B; 525/92 D; 525/92 J; 525/133; 525/179; 525/184; 525/240; 525/241

(58) Field of Classification Search ......... 525/92 B, 525/92 D, 92 J, 133, 179, 184, 240, 241; 428/41.5, 174, 220, 343, 355
See application file for complete search history.

(56) References Cited

U.S. PATENT DOCUMENTS 5,902,642 A * 5/1999 Horiki et al. ............... 427/282

6,462,160 B1 * 10/2002 Ogawa et al. .............. 526/346

FOREIGN PATENT DOCUMENTS

| JP | 7-26135   | * | 1/1995 |
| JP | 7-173382  | * | 7/1995 |
| JP | 08-024773 | * | 1/1996 |

* cited by examiner

*Primary Examiner*—Ana Woodward
(74) *Attorney, Agent, or Firm*—Cooper & Dunham LLP

(57) ABSTRACT

The object of the present invention is to provide a masking member which has good heat resistance and can be used repeatedly.

To attain this object, the present invention provide a masking member made of a polymer alloy including one or more kinds of engineering plastics selected from a group consisting of methylpentene copolymer, polysulphone, polyethersulphone, polyphenylene, sulphide, polyphenylene ether, polyamideimide, polyetherimide, polyether-etherketone; and polyamide and/or polystyrene, and styrenic thermoplastic elastomer wherein said engineering plastics and said polyamide and/or polystyrene are mixed together in a weight ratio between 30:70 to 70:30, and 2 to 20 parts by weight of said styrenic thermoplastic elastomer is added in 100 parts by weight of said engineering plastics and polyamide and/or polystyrene.

Said masking member has excellent moldability, a high level of mechanical strength and a good affinity with the coating film.

16 Claims, 11 Drawing Sheets

1 : MASKING MEMBER    32A, 32B, 32C : FITTING GROOVES
2D : FLANGE    33 : CAR BODY    34 : FRONT BUMPER
5 : SKIRT PART    36A, 36B : REINFORCING FRAMES
6C : SUPPORT PILLAR

MASKING MATERIAL

BACKGROUND OF THE INVENTION

1. Field of the Invention

The present invention relates to a masking member used to protect a part of an article from being coated.

2. Prior Art

A masking member is attached to a part of an article (a masking part) to which coating should not be applied. Said masking member can be removed from said part after curing of coating film on said article by heating to lose the fluidity of said coating film. Accordingly, said masking member can resist said heat-treatment in the coating process.

Hitherto, material consisting of thermoplastic resin mixed with inorganic filler has been provided for such masking members (TOKKAIHEI 2-126966).

Among the thermoplastic resin materials, polyolefin especially has strong solvent resistance and is mechanically reinforced by mixing with inorganic filler, so that thermal conductivity of which will increase and thermal resistance of which will also increase; therefore, said masking members can be used repeatedly.

However, with respect to the above mentioned conventional masking members, thermal resistance of which is about 100° C. at the highest even mixed with inorganic filler, and in a process of surface treatment which requires a temperature higher than that, the masking members are deformed.

As a means to solve the above described problem in the prior art, the present invention provides a masking member which is made of an engineering plastic (TOKKAIHEI 5-261323).

Said engineering plastic has high heat resistance and the masking member made of said engineering plastic has a high level of mechanical strength and said masking member does not soften or deform even at a temperature higher than 150° C.

Accordingly, in the present invention, the masking member can be used repeatedly even in the surface treatment having a heating process at a high temperature.

SUMMARY OF THE INVENTION

Nevertheless, said engineering plastics have faults of having poor moldability because of their high softening temperature and low fluidity, and due to their hardness and brittleness, are apt to crack or break when excessive force is applied, and further the coating film formed on the masking member is apt to peel off and make dirty surroundings by scattered pieces of the broken coating film since said engineering plastics have poor adhesiveness with the coating film.

As a means to solve the above described problems in the prior art, the present invention provides a masking member (11, 21, 31, 41, 51) made of polymer alloy including one ore more kinds of engineering plastics selected from a group consisting of methylpentene copolymer, polysulphone, polyethersulphone, polyphenylene sulphide, polyphenylene ether, polyamideimide, polyetherimide, polyether-etherketone; and polyamide and/or polystyrene, and styrenic thermoplastic elastomer wherein said engineering plastics and said polyamide and/or polystyrene are mixed together in a weight ratio between 30:70 to 70:30, and 2 to 20 parts by weight of said styrenic thermoplastic elastomer is added in 100 parts by weight of said engineering plastics and polyamide and/or polystyrene.

It is preferable that said masking member (11, 21, 31, 41, 51) is made of a sheet of said polymer alloy by the vacuum forming and/or the pressure forming and that the thickness of said sheet of said polymer alloy is between 0.1 to 1.5 mm.

In particular, it is preferable that said engineering plastics is polyphenylene ether and said polyamide is nylon 6.

Further, it is preferable that said styrenic thermoplastic elastomer is styrene-hydrogenated polyolefin-styrenic block copolymer.

BRIEF DESCRIPTION OF THE DRAWINGS

FIG. 1 shows the perspective view of a masking member and a pillar to which said masking member is attached.

FIG. 2 shows the sectional view along A-A line in FIG. 4 illustrating provisional attaching of said masking member to said pillar.

FIG. 3 shows the sectional view along A-A line in FIG. 4 illustrating the end attaching of said masking member to said pillar.

FIG. 4 shows the perspective view illustrating a case where said masking member is attached to a pillar.

FIG. 6 shows the perspective view of a masking member and the front bumper of a car to which said masking member is attached.

FIG. 7 shows the side-sectional view illustrating a case where said masking member is attached to said bumper.

FIG. 8 shows the cross-sectional view illustrating a case where said masking member is attached to said bumper.

FIG. 9 shows the perspective view of a masking member and the door window frame of a car to which said masking member is attached.

FIG. 10 shows the perspective view illustrating a case where said masking member is attached to said window frame.

FIG. 11 shows the sectional view along A-A line in FIG. 10. FIG. 12 shows the sectional view along B-B line in FIG. 10.

FIG. 13 shows the perspective view of a masking member and the instrument panel of a car before coating.

FIG. 14 shows the sectional view along A-A line in FIG. 13.

FIG. 15 shows the perspective view illustrating after coating of said instrument panel to which said masking member is attached.

FIG. 16 shows the sectional view along B-B line in FIG. 15.

FIG. 17 shows the perspective view of said instrument panel coated in two colors.

Figure 1:
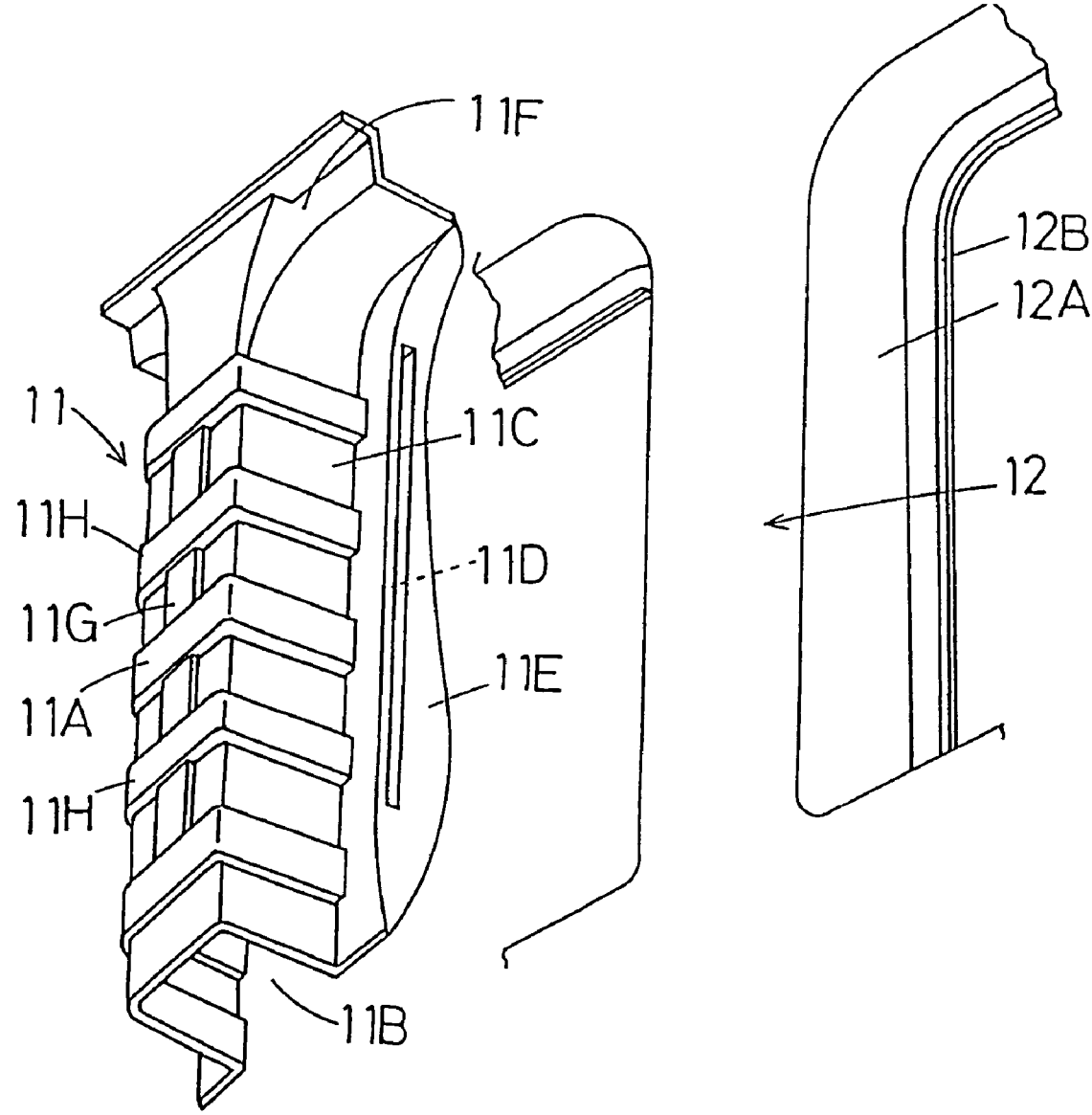
FIGS. 1 to 4 relate to the first embodiment of the present invention.

In the drawings 11, 21, 31, 41, 51, masking members.

DESCRIPTION OF THE PREFERRED EMBODIMENTS

An engineering plastic used in the present invention is such as: thermoplastic-type engineering plastic chosen from polysulfone (PSF), polyethersulfone (PES), polyphenylene ether (PPE), poly (phenylene sulfide) (PPS), polyetheretherketone (PEEK), polyamideimide (PAI). Polyetherimide (PEI), methylpentene copolymer (TPX).

Two or more kinds of said engineering plastics may be mixed together in the present invention. Preferable engineering plastics may be PPE which has good moldability.

In the present invention, polyamide and/or polystyrene are(is) mixed in said engineering plastics. Said polyamide is such as: poly(tetramethylene adipamide) (nylon 46), poly (hexamethylene adipamide) (nylon 66), polypyrrolidone (nylon 4), poly caprolactam (nylon 6), polyheptolactam (nylon 7), polycaprilactam (nylon 8), polynonanolactam (nylon 9), polyundeca 1 lactam (nylon 11), polydodeca 1 lactam (nylon 12), polyhexamethylene azelaic acid amide (nylon 69), polyhexamethylene sebacic acid amide (nylon 610), polyhexamethylene phthalamide (nylon 6iP), polyhexamethylene terephthalamide, polyhexamethyleneisophthalamide, polytetramethyleneisophthalamide, poly(m-xylene adipamide), nylon MSD6, polyamide consisting of hexamethylenediamine and n-dodecanedioic acid (nylon 612), polyamide consisting of dodecamethylenediamine and n-dodecanedioic acid (nylon 1212), hexamethylene adipamide/caprolactam (nylon66/6), hexamethylene adipamide/hexamethyleneisophthalamide (nylon66/nylon 6iP), hexamethylene adipamide/hexamethyleneterephthalamide (nylon66/nylon 6T), trimethylhexamethylene oxide/hexamethylene oxide (nylontrimethyl-62/62), hexamethylene adipamide/hexamethylene azelaic acid amide (nylon66/nylon69), hexamethylene adipamide/hexamethylene azelaic acid amide/caprolactam (nylon66/nylon69/nylon6), poly (capronamide/hexamethylene sebacic acid amide) (nylon6/610), poly(capronamide/hexamethylenedodecanoic acid amide) (nylon6/612), nylonMXD6, poly(capronamide/hexamethyleneisophthalamide) (nylon6/6I), aromatic polyamide and the like. Two or more kinds of said polyamides may be mixed together in the present invention. Preferable polyamides are nylon 6, nylon 66, nylon 610, nylon 11 and nylon 12. Said polyamides give toughness to said polymer alloy to ease to perform the deep drawing by the vacuum and/or pressure forming.

Polystyrene used in the present invention includes both general type and high impact type, and high impact type may be preferable. Further, styrenic thermoplastic elastomer is used in the present invention. Said thermoplastic elastomer may include styrene-butadiene-styrene block copolymer (SBS), styrene-isoprene-styrene block copolymer (SIS), α-methylstyrene-butadiene-α-methylstyrene block copolymer (α-MeS-Bd-MeS), α-methylstyrene-isoprene-α-methylstyrene block copolymer, styrene-hydrogenated polyolefin-styrene block copolymer (SEBS) and the like. Preferable styrenic thermoplastic elastomer may be SEBS having good heat and weather resistance.

In a mixture of said engineering plastics and rubber and/or elastomer, a reinforcing material may be added in order to increase shape retention, dimensional stability, compressive and tensile strength and the like. Said reinforcing material is such as: an inorganic filler such as calcium carbonate, magnesium carbonate, barium sulphate, calcium sulphate, calcium sulfite, calcium phosphate, calcium hydroxide, magnesium hydroxide, aluminum hydroxide, magnesium oxide, titanium oxide, iron oxide, zinc oxide, alumina, silica, diaton earth, dolomite, gypsum, talc, clay, asbestos, mica, glass fiber, carbon fiber, calcium silicate, calcium carbonate, bentonite, white carbon, carbon black, iron powder, aluminum powder, stone powder, blast furnace slag, fly ash, cement, zirconia powder and the like; natural fiber such as cotton, hemp, bamboo fiber, coconut fiber, wool and the like; organic synthetic fiber such as polyamide fiber, polyester fiber, acrylic fiber, viscose fiber, acetate fiber, vinyl chloride fiber, vinylidene choloride fiber and the like; inorganic fiber such as asbestos fiber, glass fiber, carbon fiber, ceramic fiber, metallic fiber, whisker and the like; an organic, filler such as linter, linen, sisal, wood flour, coconut flour, walnut flour, starch, wheat flour and the like. An amount of from 0.5 to 200% by weight of said filler is commonly mixed with said engineering plastic.

If desirable, one or more kind(s) of thermoplastic resin(s) such as polyolefin such as polyethylene, polypropylene, ethylene-propylene copolymer, ethylene-vinyl acetate copolymer and the like, polyvinyl chloride resin, acrylic resin, methacrylic resin, polyvinylidene chloride resin, vinyl propionate resin, styrene-butadiene copolymer, polyester resin and the like may be mixed in said polymer alloy.

Said polymer alloy may be colored by a pigment or a dyestuff to discriminate the masking parts, and also, a plasticizer such as a DOP, a DBP and the like, an antioxidant, an antistatic agent, a crystallization agent, a flame retardant, an antiflaming agent, an insecticide, an antiseptic, waxes, a lubricant, an age resister, an ultraviolet absorber, a blowing agent such as a chemical blowing agent or a capsule type blowing agent, and the like may be mixed with said polymer alloy. Two or more kinds of said agents may be mixed and then added to said polymer alloy.

To manufacture the masking member by using said polymer alloy as a material, commonly the vacuum forming or the vacuum-pressure forming method is applied, in which procedure a film or a sheet of said polymer alloy can be formed accurately and precisely into a deep drawing shape or complicated shape readying the masking member for efficient mass production. However, the pressure forming, press molding, blow molding, injection molding, or the like may also be applied to manufacture the masking member.

A sheet or an expanded sheet of thermoplastic resin such as polyolefin such as polyethylene, polypropylene, ethylene-propylene-copolymer, ethylene-vinyl acetate copolymer and the like, polyvinyl chloride resin, acrylic resin, methacrylic resin, poly- vinylidene chloride resin, styrenic resin, vinyl propionate resin, styrene-butadiene copolymer, polyester resin and the like may be laminated on said sheet of polymer alloy.

In order to enhance affinity of masking member surface made of said polymer alloy with paint or adhesive, the surface treatment such as corona discharge treatment, primer coating treatment and so on, may be performed.

A primer used in the primer coating is, for example, a synthetic resin type primer such as modified polyolefin (e.g. chlorinated polypropylene), olefin copolymer (e.g. ethylene-vinylacetate copolymer), acrylic synthetic resin, vinyl synthetic resin, acrylic synthetic resin including amino group and/or amide, vinyl synthetic resin including amino group and/or amide, amino synthetic resin, epoxy resin and the like; synthetic rubber such as stylene-butadiene rubber, acrylnitrile-butadiene rubber, chloroprene-rubber, polybutadien, and the like; and a low-molecular weight compound such as aluminium alcholate or aluminium chelate agent such as aluminium isopropylate, aluminium triacetylacetonate and the like; an alkyl metal such as 2-ethylhexyl lead, hexadecyl lithim and the like; an organotin compound such as dibutyl tin diacetate, di-n-butyl tin dioxide and the like; a silane compound such as methylvinyl dichloro silane and the like; a metal complex salt of 1,3-dicarbonyl compound such as acetylacetone lithium, acetylacetone beryllium and the like; an organotitanium compound such as tetrabutyl titanate and the like; a boric acid compound such as tri-n- butyl borate, triphenyl borate and the like; a phosphate such as trioleil phosphate, tridecyl phosphate and the like; a metal salt of a carboxylic acid such as magnesium stearate, cobalt naphtenic acid and the like; a metal thioalcholate such as n-potassium dodecylmercapto chloride and the like; a thiodicarboxylate such as zinc 2-ethylhexane dithiocarboxylate and the like; a metal salt of a dithiocarbamic acid such as nickel dimethyldithiocarbamate, copper dimethyldithiocarbamate and the like; a metal salt of sulfonic acid such as nickel benzenesulfonate and the like; an organophosphate compound such as dibutylvanadium phosphate and the like. One or more kinds of said primer may be mixed together.

Said primer has affinity with both said engineering plastic and synthetic resin other than said engineering plastic which is generally used as a paint vehicle or an adhesive for said engineering plastic. A preferable primer is an acrylic synthetic resin containing quarternary ammonium salt or a synthetic resin containing amino group.

For the primer coating treatment, a solution or an emulsion of one or more kinds of said primer is coated on the surface of said engineering plastic as the material for the masking member and then dried.

Prior to said primer coating treatment, an affinity treatment may be effected on the surface of said engineering plastic. The examples of said affinity treatment include flame treatment, sulfuric acid treatment, corona discharge treatment and the like, and the surface of said engineering plastic is slightly carbonized by said treatment to obtain the affinity with other synthetic resin.

Said engineering plastics have good heat resistance, and the masking member made thereof has a high level of mechanical strength, not softening or deforming even at a temperature higher than 150° C. When polyamide and/or polystyrene and styrenic thermoplastic elastomer are mixed to prepare a polymer alloy, the moldability of said engineering plastics can be improved without the degradation of their heat resistance. The toughness and the elongation property of said engineering plastics can be further improved to ease the deep drawing procedure ensuring the sheet's integrity despite its thickness (commonly 0.2~0.8 mm). A masking member made of a thin sheet of said polymer alloy has an improved breaking strength. This polymer alloy also has a better affinity with coating film.

EMBODIMENTS

The First Embodiment

FIGS. 1 to 4 relate to the first embodiment of the present invention. A masking member (11) of this embodiment is used to protect pillar shaped members such as the center pillar (12) of a car from being coated. Said masking member (11) consists of a body (11A) in the inside (11B) of which a body (12A) of the center pillar (12) is to be fitted, a pair of flange grooves (11D, 11D) formed along lever edges of the side walls (11C, 11C) of said body (11A) into which a pair of flanges(12B, 12B) of said center pillar (12) are to be inserted respectively, a pair of back side applying parts (11E, 11E) extending from said flange grooves(11D, 11D) respectively, and an upper side applying part (11F) extending from the top of said body (11A), and a reinforcing longitudinal rib (11G) and reinforcing horizontal ribs (11H) are formed on the circumference of said body (11A). Said masking member (11) is manufactured by the vacuum forming of a polymer alloy sheet (thickness 0.4 mm) made of a polymer alloy in which 10 parts by weight of SEBS is mixed in 100 parts by weight of a mixture consisting of PPE and nylon 66 (40:60 weight ratio) and further in which 5% by weight of calcium carbonate is mixed.

Figure 2:
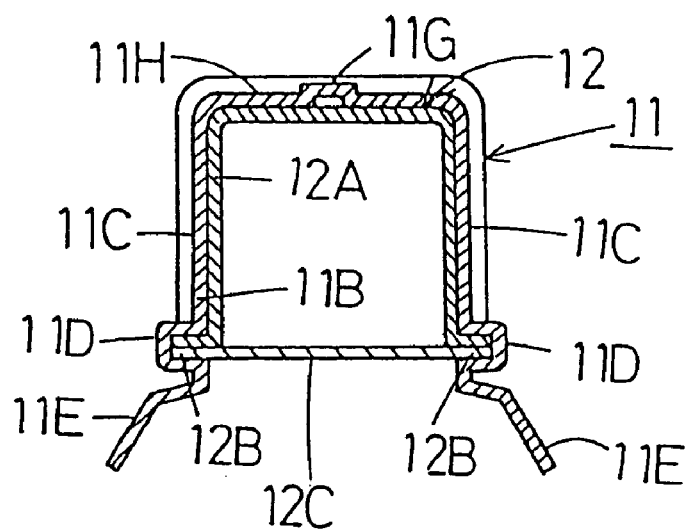

As shown in FIG. 2, said masking member (11) is provisionally attached to the body (12A) of said center pillar (12) by fitting said body (12A) in the inside (11B) of said body (11A) of said masking member (11) and further inserting flanges (12B, 12B) of said center pillar (12) into flange grooves (11D, 11D) of said masking member (11) respectively.

Figure 3:
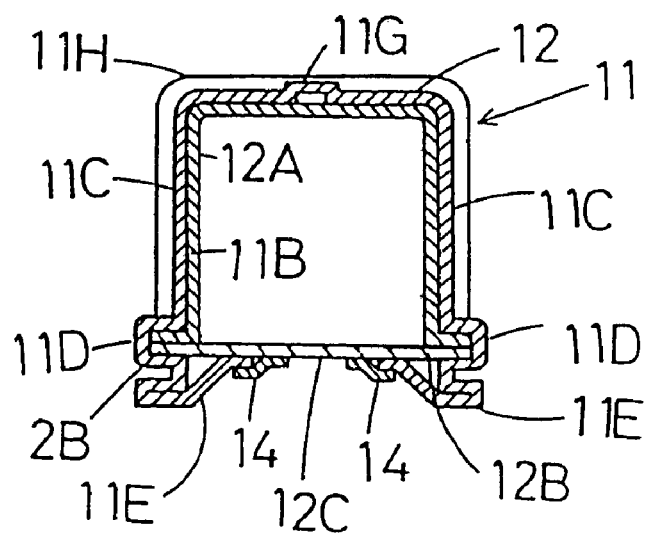

After said provisional attaching, back side applying parts (11E, 11E) are applied on the back side panel (12C) of said center pillar (12) respectively turning said back side applying parts (11E,11E) to the back side and said back side applying parts (11E, 11E) are fixed to said back side panel (12C) with adhesive tape (14), tacks or the like as shown in FIG. 3.

Figure 4:
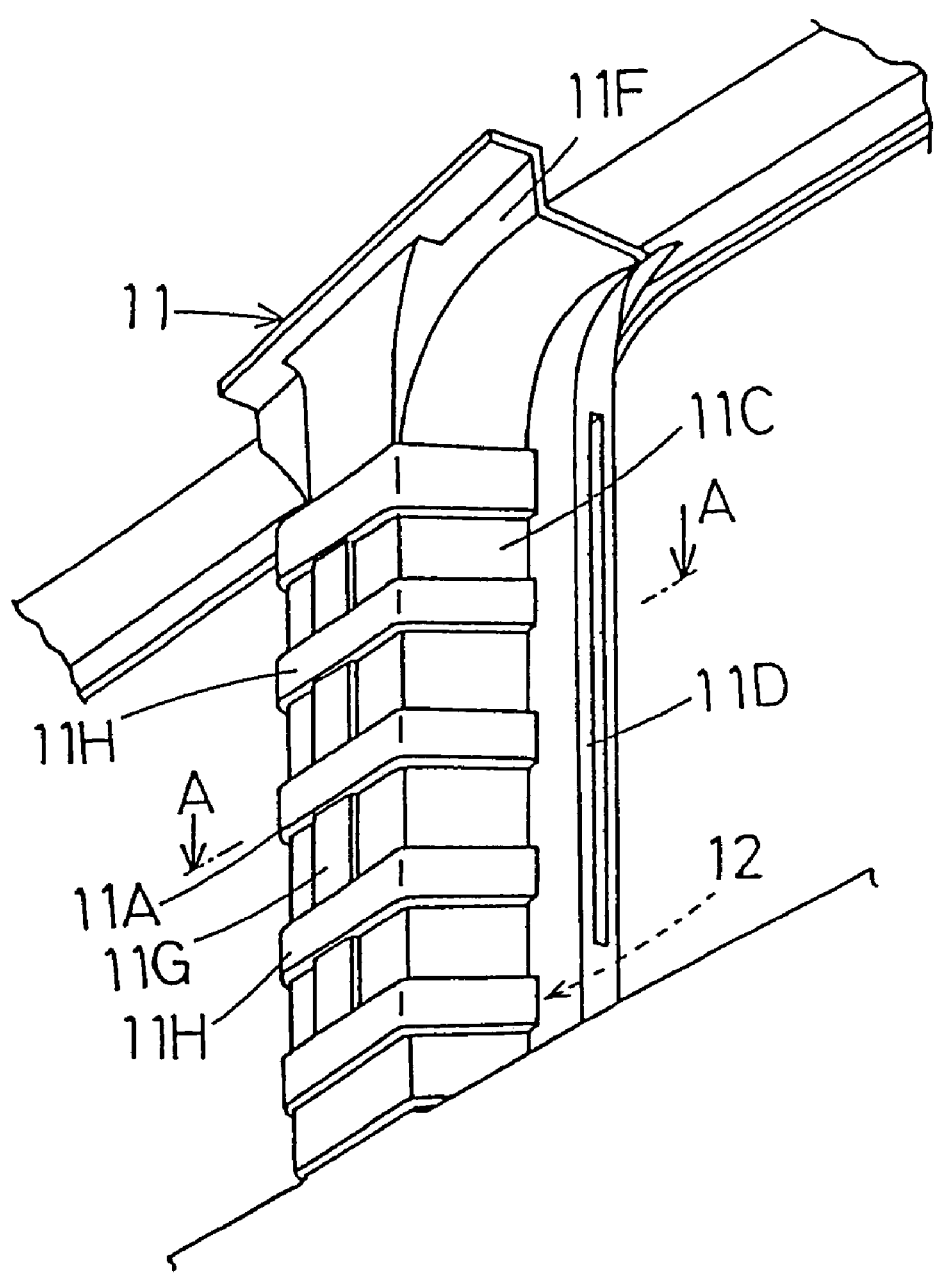

After said masking member (11) is attached to said center pillar (12) as shown in FIG. 4, the car is coated with a thermosetting melanine-alkyl resin paint or the like.

The Second Embodiment

Figure 5:
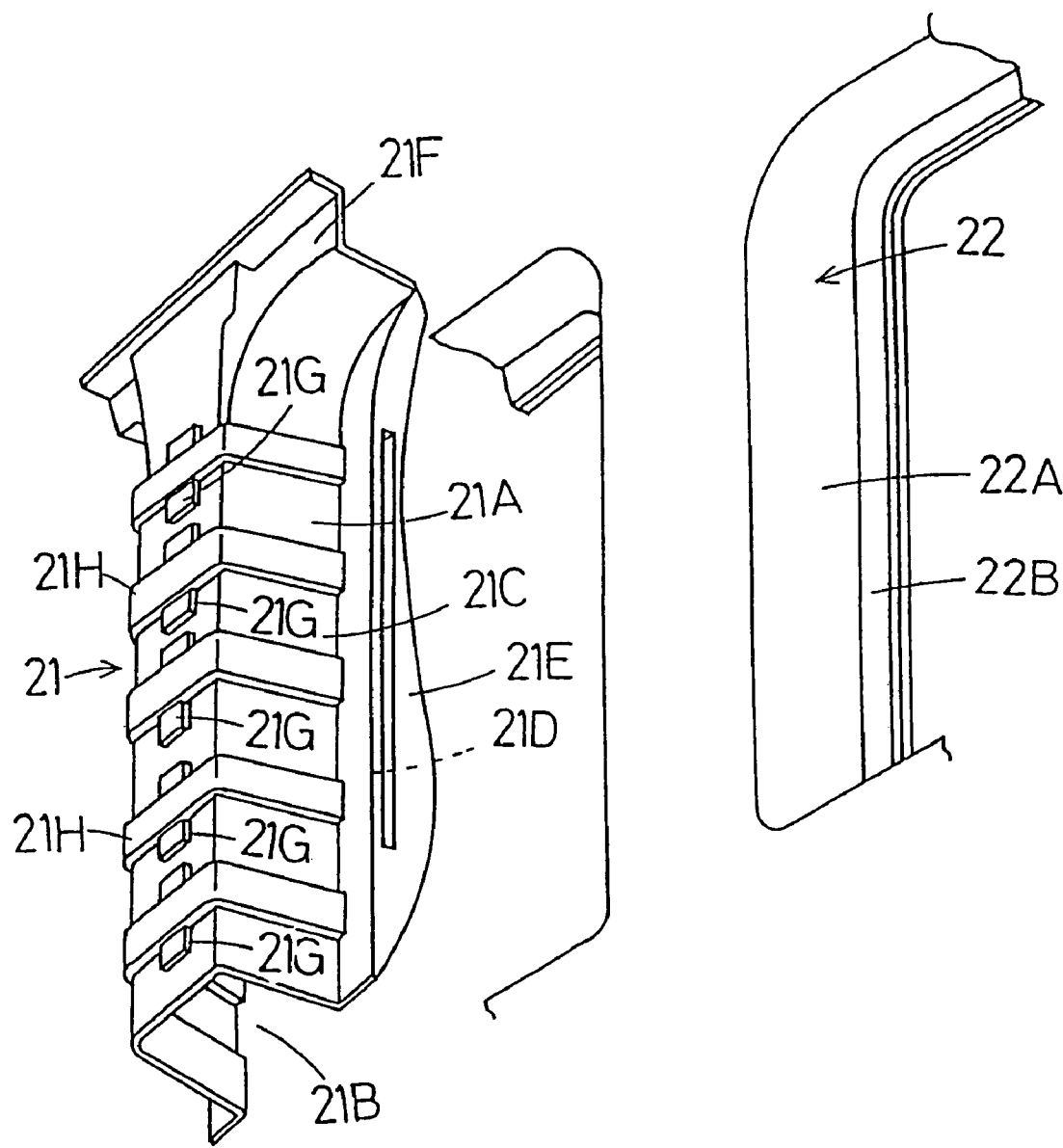
FIG. 5 relates to the second embodiment and shows a perspective view of a masking member and a pillar to which said masking member is attached.

FIG. 5 relates to the second embodiment of the present invention. A masking member (21) of this embodiment consists of a body (21A) in the inside of which a body (22A) of a center pillar (22) is to be fitted, a pair of flange grooves (21D, 21D) formed along lower edges of the side walls (21C, 21C) of said body (21A) into which a pair of flanges (22B, 22B) of said center pillar (22) are to be inserted respectively, a pair of back side applying parts (21E, 21E) extending from said flange grooves (21D, 21D), and an upper side applying part (21F) extending from the top of said body (21A) and a plural number of reinforcing longitudinal ribs (21G) and reinforcing horizontal ribs (21H) are formed on the circumference of said body (21A).

Being different from the first embodiment, said reinforcing longitudinal ribs (21G) are formed intermittently in this embodiment. Said masking member is manufactured by the vacuum-pressure forming of a polymer alloy sheet (thickness 0.3 mm) made of polymer alloy in which 15 parts by weight of SBC is mixed in 100 parts by weight of a mixture of PPS and high impact polystyrene (50:40 weight ratio) and further in which 3% by weight of carbon black is mixed.

In the same way as stated in the first embodiment, said masking member (21) is provisionally attached to the body (22A) of said center pillar (22) by fitting said body (22A) in the inside of said body (21A) of said masking member (21) and further inserting flanges (22B, 22B) of said center pillar (22) into flange grooves (21D, 21D) of said masking member (21) respectively, following which back side applying parts (21E, 21E) are applied on the back side panel of said center pillar (22) respectively turning said back side applying parts (21E, 21E) to the back side and said back side applying parts (21E, 21E) are fixed to said back side panel (22C) with adhesive tape, tacks, or the like.

After said masking member (21) is attached to said center pillar (22), the car is coated with a paint.

In the first embodiment, said masking member (11) is apt to bend horizontally along said reinforcing longitudinal rib (11G) since said rib (11G) is continuous while in this embodiment, said masking member (21) has increased horizontally bending strength along ribs (21G) since said ribs (21G) are intermittent.

The Third Embodiment

Figure 6:
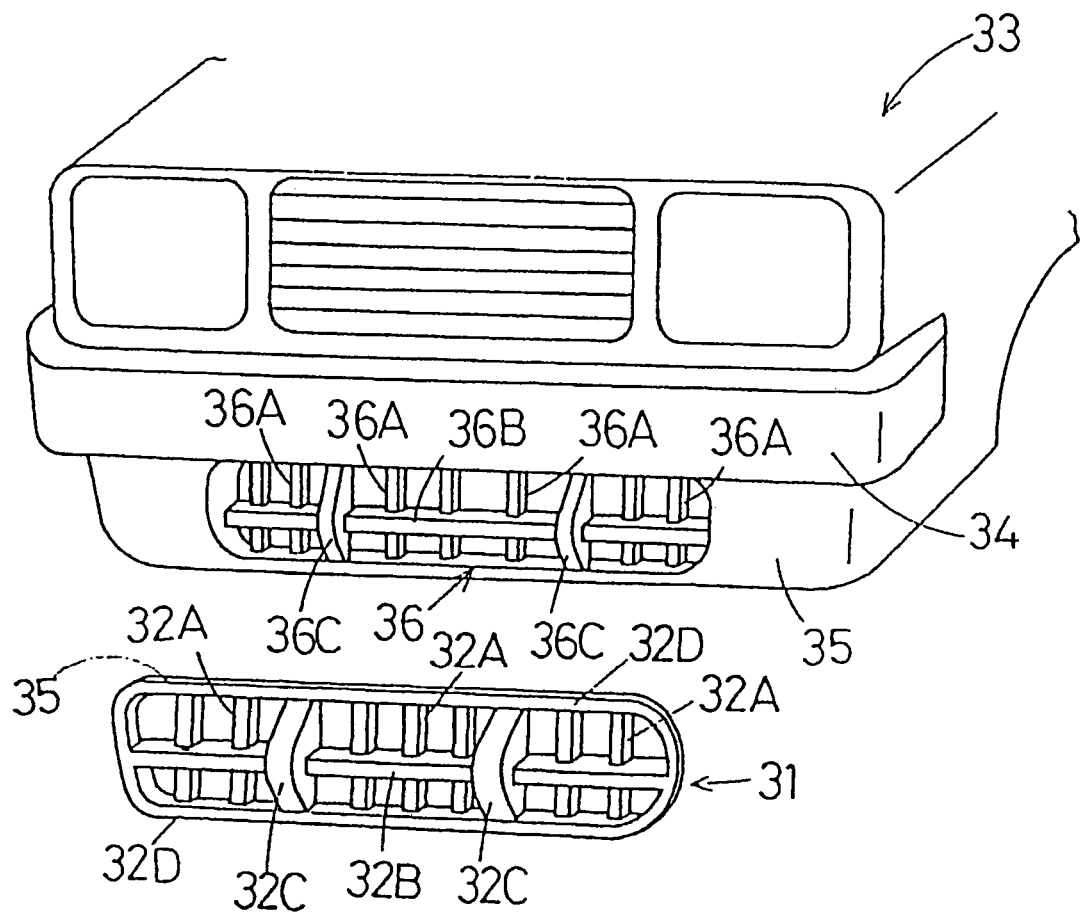
FIGS. 6 to 8 relate to the third embodiment.
Figure 7:
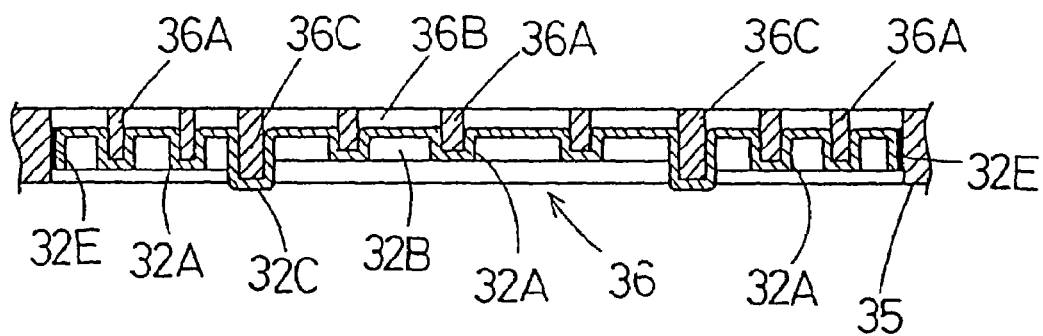
Figure 8:
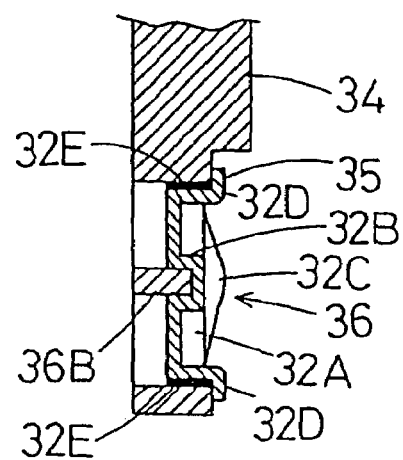
Figure 9:
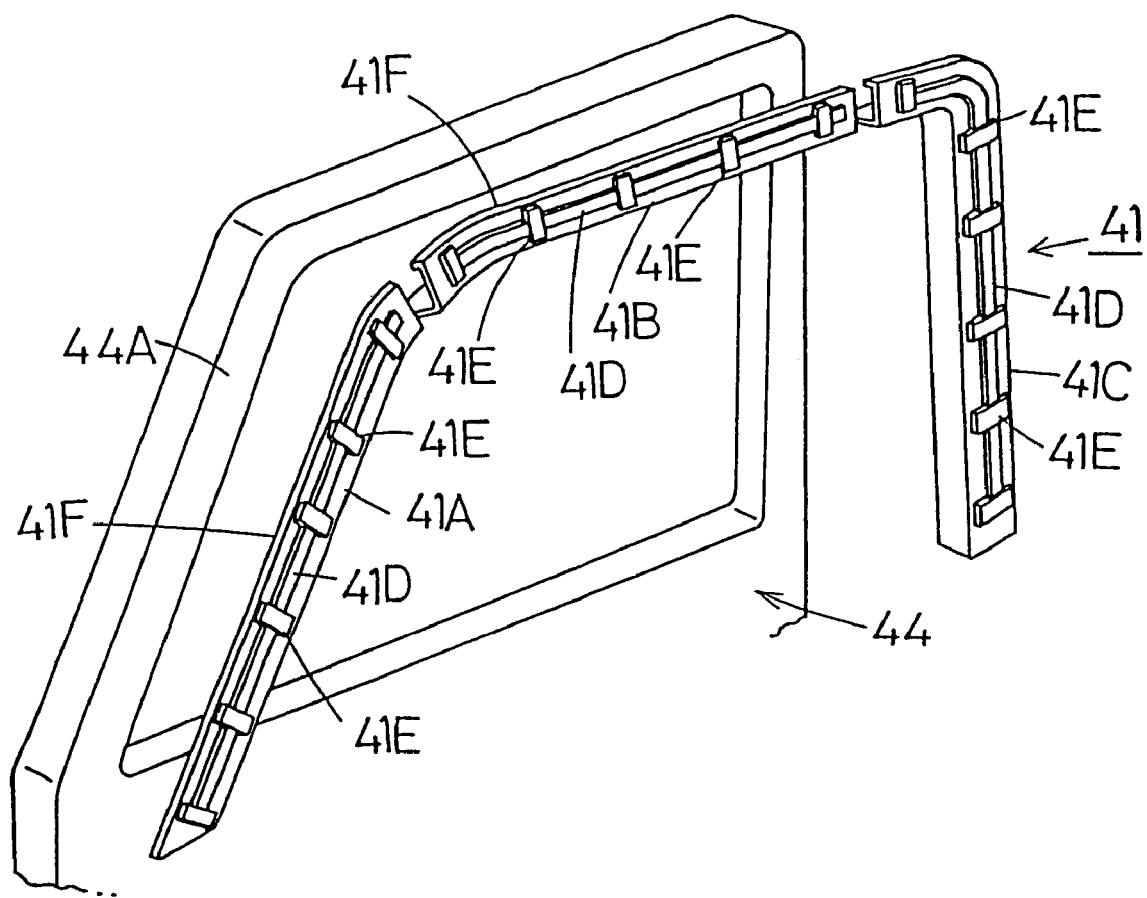
FIGS. 9 to 12 relate to the forth embodiment of the present invention.

FIGS. 6 to 8 relate to the third embodiment of the present invention. As shown in FIG. 6, a car body (33) has a front bumper (34) and when said car body (33) is coated, a masking member (31) of this embodiment is attached to the air inlet hole (36) of the lower skirt part (35) of said front bumper (34). A plural number of reinforcing frame bars (36A, 36B) are equipped lengthwise and breadthwise and a pair of support pillars (36C) are equipped in the both sides of said air inlet hole (36). Correspondingly, frame bar grooves (32A, 32B) to insert said reinforcing frame bars (36A, 36B) are equipped lengthwise and breadthwise in said masking member (31) and a pair of pillar grooves (32C) to insert said support pillars (36C) are equipped in both sides of said masking member (31). Further, a pressure sensitive adhesive layer (32F) is formed on the circumference of said masking member (31). Said masking member (31) is manufactured by the vacuum forming of a polymer alloy sheet (thickness 0.2 mm) made of a polymer alloy in which 8 parts by weight of SIS is mixed in 100 parts by weight of a mixture of PPE and nylon 6 (50:50 weight ratio).

Said masking member (31) is fitted in the inside of said air inlet hole (36) and each reinforcing frame bar (36A, 36B) is inserted into each frame bar groove (32A, 32B) and each support pillar (36C) is inserted into each pillar groove (32C), and said masking member (31) is fixed in the inside of said air inlet hole (36) with its pressure sensitive adhesive layer (32E). Nevertheless said pressure sensitive adhesive layer (32E) may not always be necessary in the present invention.

As above described, said masking member (31) is attached in said air inlet hole (36) of the skirt part (35) which is a masking part and then said car body (33) is coated with a paint and after that, the resulting coating film is cured by heating.

The Fourth Embodiment

FIGS. 9 to 12 relate to the fourth embodiment of the present invention. A masking member (41) of this embodiment is used to protect the window frame (44A) of a car door (44) and said masking member (41) consists of three divisional parts (41A, 41B, 41C), each cross section of each divisional part is L-shaped respectively. A longitudinal reinforcing rib (41D) and cross ribs (41E) are formed in each divisional part (41A, 41B, 41C) respectively.

Said masking member (41) is manufactured by the vacuum-pressure forming of a polymer alloy sheet (thickness 0.5 mm) made of a polymer alloy in which 20 parts by weight of SEBS is mixed in 100 parts by weight of a mixture of PPS and nylon 66 (70:30 weight ratio).

Figure 10:
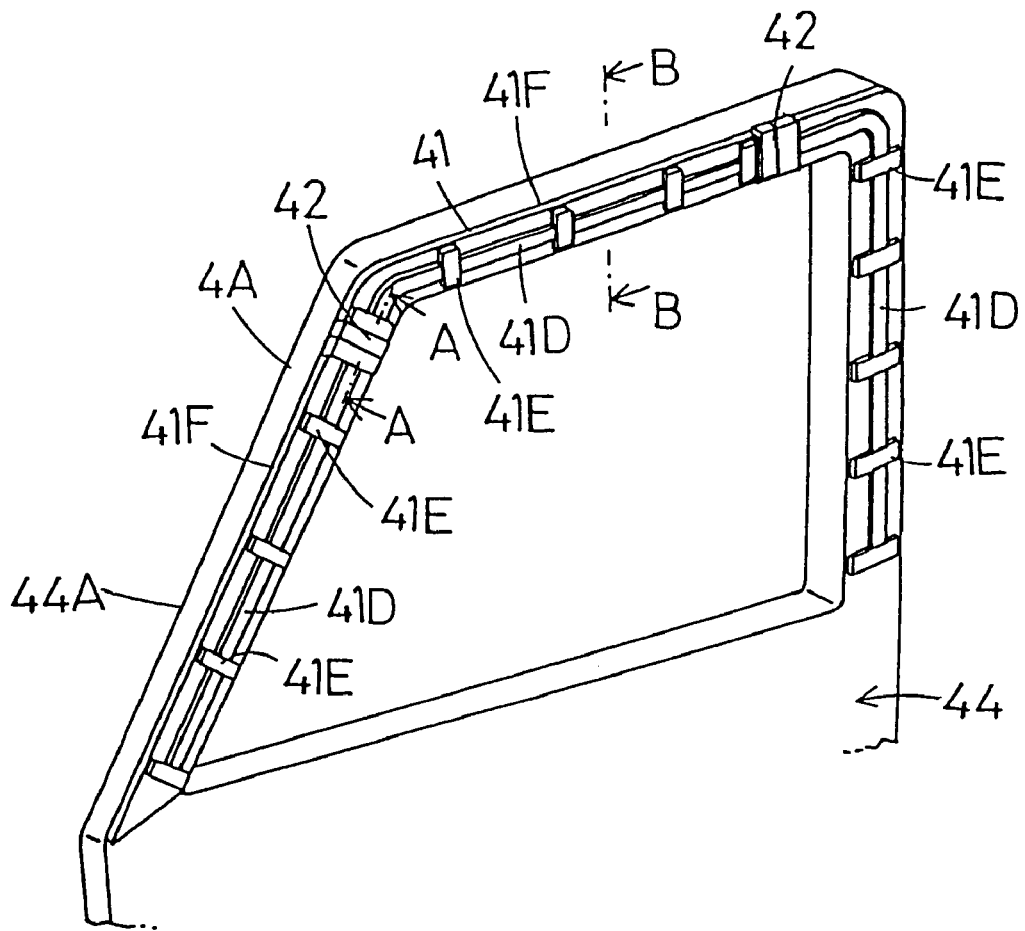

In order to attach said masking member (41) to said window frame (44A) of the door (44), each divisional part (41A, 41B, 41C) is attached to said window frame (44A), overlapping the connecting ends of said divisional parts (41A, 41B, 41C) respectively and said overlapped connecting ends are fixed with adhesive tape (42), etc. as shown in FIG. 10.

Figure 11:
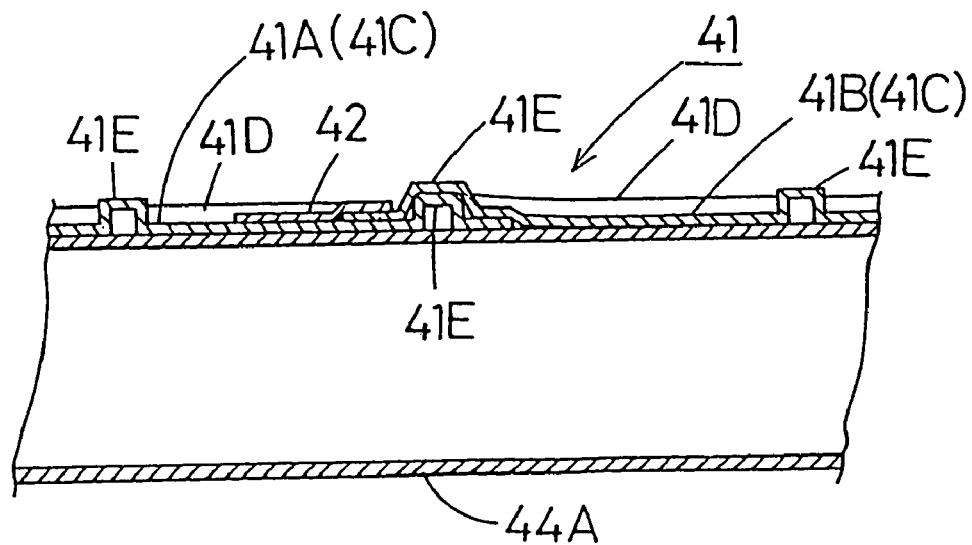
Figure 12:
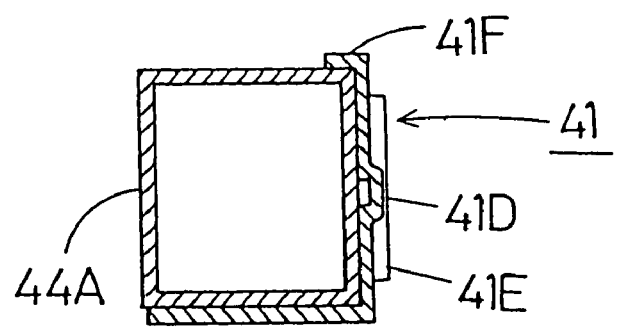

In this case, in said overlapped connecting ends, a cross rib (41E) of the connecting end of one divisional part (41A or 41B) is fitted under a cross rib (41E) of the connecting end of the other divisional part (41B or 41C) as shown in FIG. 11 and upper edge hook part (41F) of each divisional part (41A, 41B, 41C) is hanged on the upper edge of said window frame (44A) as shown in FIG. 12. After coating, said masking member (41) is removed from said window frame (44A) of the door (44). Said window frame (44A) is not coated with the paint since said window frame (44A) was protected by said masking member (41).

The Fifth Embodiment

FIGS. 13 to 17 relate to the fifth embodiment of the present invention. In the front of an instrument panel (52), an installation hole (55) in which a globe component is installed, installation holes (56, 57) in which an audio system is installed, an installation part (58) in which instruments are installed, an installation part (59) in which a small articles box is installed, and the likes are provided, and said instrument panel is divided into an upper part (52A) and a lower part (52B).

Figure 14:
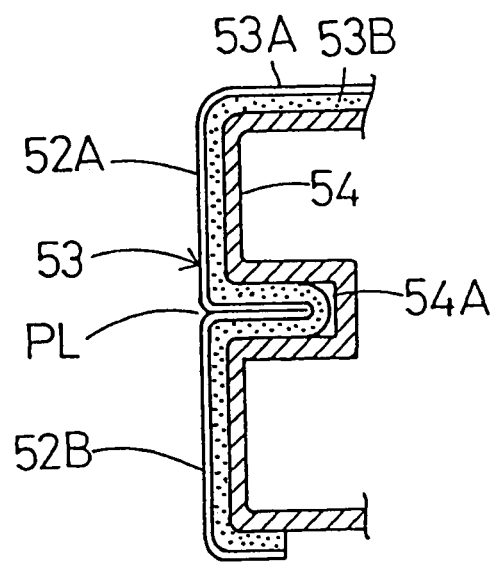

As shown in FIG. 14, said instrument panel (52) consists of a base (54) and a surface trim (53) which is put on the surface of said base (54), and said surface trim (53) consists of a surface layer (53A) made of a non-woven fabric, a synthetic leather or the like, and a wadding layer (53B) made of a non-woven fabric, a foamed plastic sheet or the like backed on said surface layer (53A), and further said surface layer (53A) is colored in a designated color (base color) and the thickness of said wadding layer (53B) can be elastically compressed.

Along the boundary between said upper part (52A) and said lower part (52B), a groove (54A) is formed in said base (54) and a parting line PL is formed by inserting said surface trim (53) into said groove (54A). Said surface trim (53) is fixed in said grooves (54A) with thickness of wadding layer (53B) being compressed and elastically rebounding.

Figure 13:
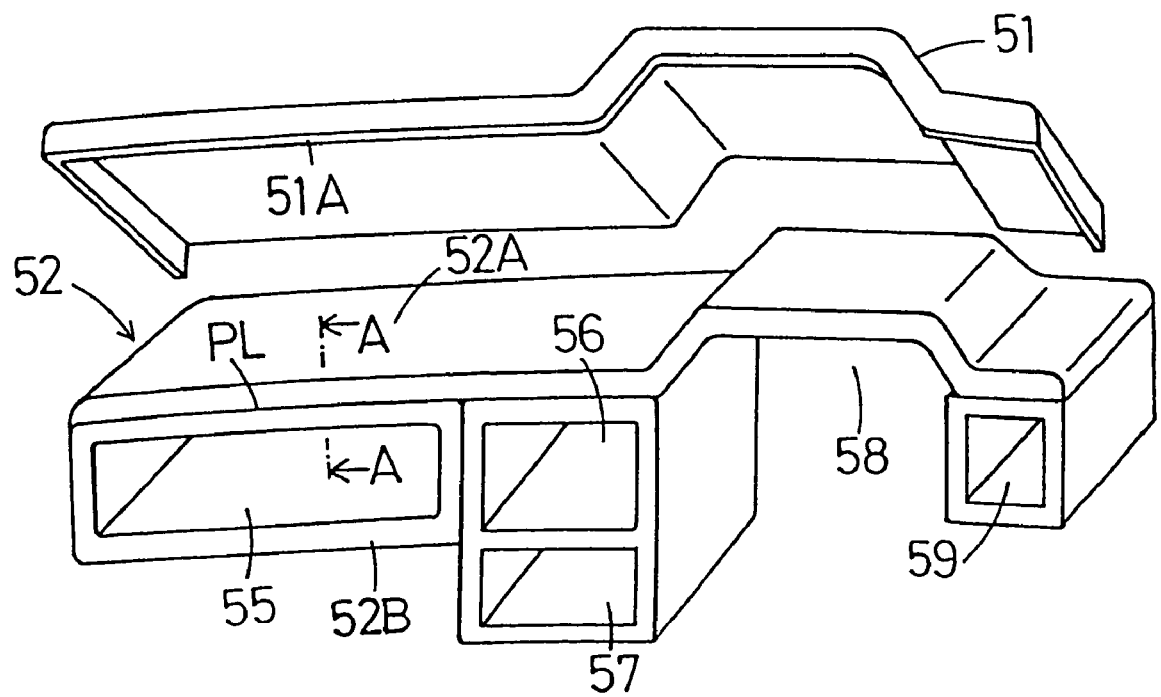
FIGS. 13 to 17 relate to the fifth embodiment of the present invention.

Since said instrument panel (52) is decorated with said surface trim (53) common to both upper and lower parts, said upper part (52A) and said lower part (52B) are colored in the same color respectively. Said instrument panel (52) may be installed in the car body as it is, or in a case where said upper part (52A) and lower part (52B) of said instrument panel (52) are colored in different colors respectively, a masking member (51) is used as shown in FIG. 13. Said masking member (51) has a shape corresponding to said upper part (52A) of said instrument panel (52) and an engaging flange (51A) is formed on the circumference edge of said masking member (51).

Figure 15:
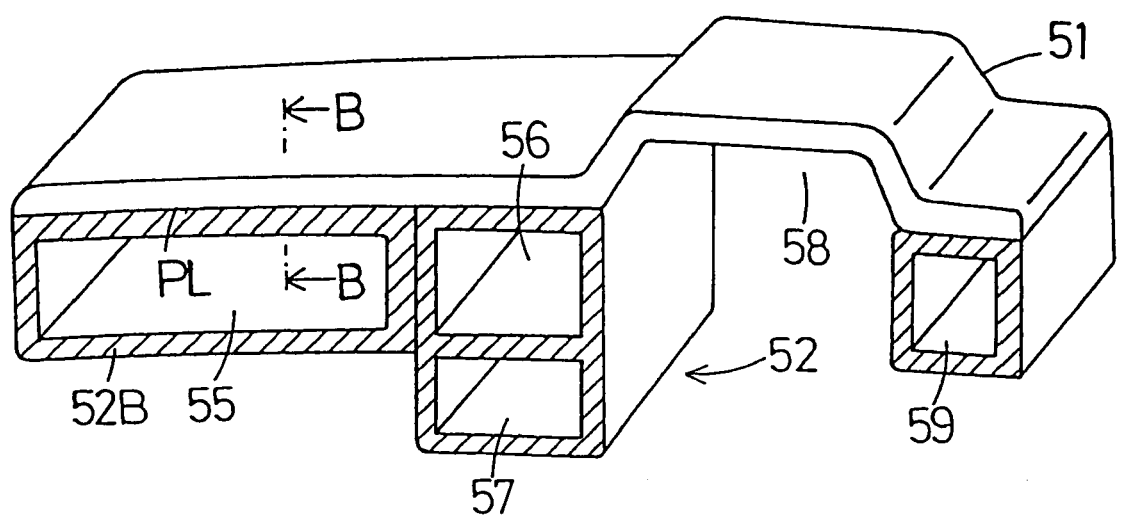
Figure 16:
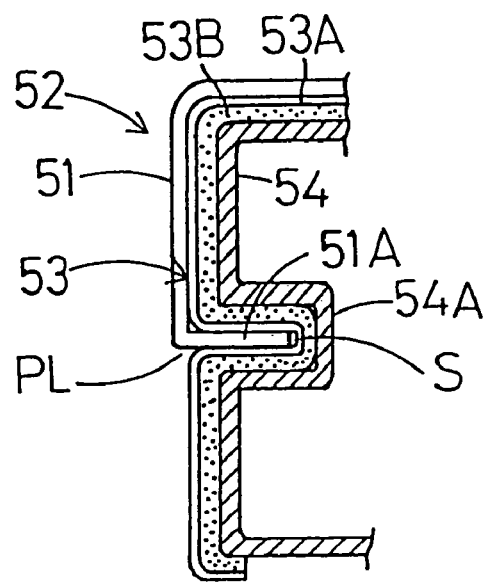
Figure 17:
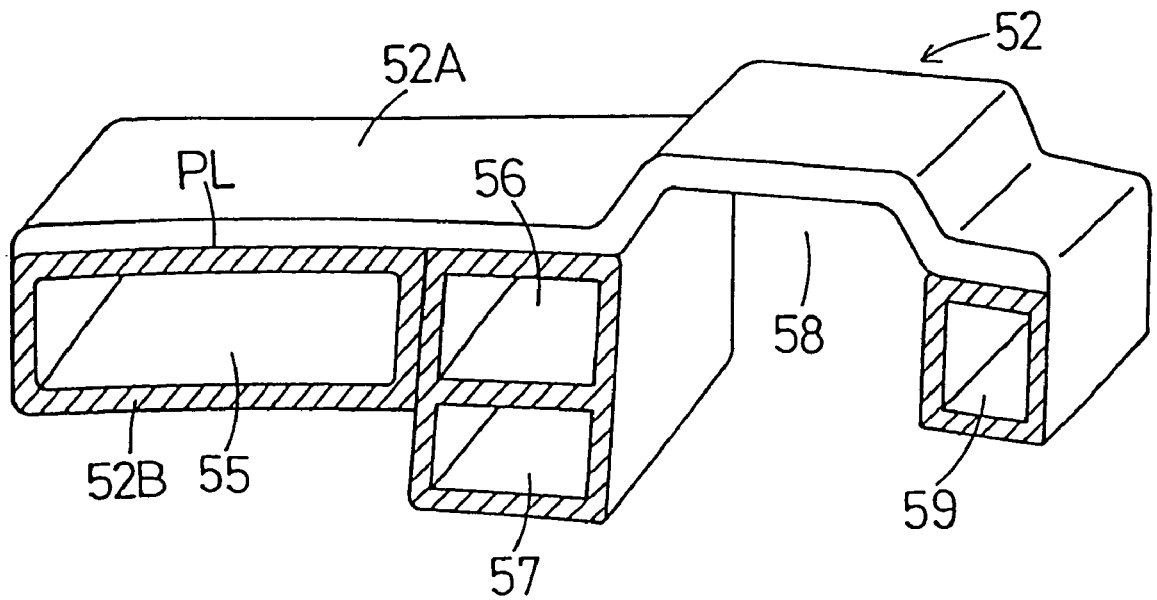

As shown in FIG. 15, said masking member (51) is put on said upper part (52A) and as shown in FIG. 16, is fixed by inserting said engaging flange (51A) into the slit S of said parting line PL. As above-described, said masking member (51) is put on said upper part (52A) of said instrument panel and then said lower part (52B) is coated in a different color from said upper part (52A) by such as spray coating. After coating, said masking member (51) is removed from said upper part (52A)

In the above-described manner, said instrument panel (52) whose upper part and lower part are coated in different colors respectively is easily prepared.

As above-described, said masking member (51) is put on said upper part (52A) of said instrument panel and then said lower part (52B) is coated in a different color from said upper part (52A) by such as spray coating. After coating, said masking member (51) is removed from said upper part (52A).

In the above-described manner, said instrument panel (52) whose upper part and lower part are coated in different colors respectively is easily prepared.

Said masking member (51) of this embodiment is manufactured by the pressure forming or press molding of a polymer alloy sheet (thickness 0.4 mm) made of polymer alloy in which 10 parts by weight of SEBS, 2 parts by weight of titanium oxide, and 0.5 parts by weight of carbon black are mixed in a mixture of PPE and nylon 6 (40:60 weight ratio).

In the present invention, a masking member can be provided, having excellent heat and crack resistance, ant excellent moldability suitable for deep drawing shape and/or complicated shape, and also suitable for vacuum forming, vacuum-pressure forming or pressure forming which enables mass production. With said moldability, said masking member can be molded into any shape corresponding to masking parts, and when said vacuum, vacuum pressure or pressure forming is applied, a thin polymer alloy sheet can be used, resulting in low costs of materials. Further, since said masking member has affinity with the coating film of paint, said coating film is hard to peel off from said masking member so that it is certainly avoided that pieces of said coating film peeling off from said masking member contaminate the surrounding area of said masking member. As a result, the masking member in the present invention can be used repeatedly.

What is claimed is:

1. A reusable masking member protect a prescribed part of an article from a coating applied to said article, said masking member being a polymer alloy manufactured by molding a sheet comprising one or more kinds of engineering plastics (1), polyamide and/or polystyrene (2), and styrenic thermoplastic elastomer (3), wherein said engineering plastics (1) are selected from the group consisting of methylpentene copolymer, polysulphone, polyethersulphone, polyphenylene sulphide, polyphenylene ether, polyamideimide, polyetherimide, and polyether-etherketone; and said engineering plastics (1) and said polyamide and/or polystyrene (2) are mixed together in a weight ratio of 30:70 to 70:30, and then 2 to 20 parts by weight of said styrenic thermoplastic elastomer (3) is added in 100 parts by weight of a combination of said engineering plastics and polyamide and/or polystyrene, said masking member having an affinity with said coating so as to avoid pieces of said coating peeling off from said masking member and contaminating the area adjacent to said prescribed part.

2. A masking member in accordance with claim 1, wherein said masking member is manufactured by vacuum forming and/or pressure forming of said sheet.

3. A masking member made of a polymer alloy in accordance with claim 2, wherein the thickness of said sheet of said polymer alloy is from 0.1 to 1.5 mm.

4. A masking member in accordance with claim 1, wherein said engineering plastics is polyphenylene ether.

5. A masking member in accordance with claim 1, wherein said polyamide is nylon 6.

6. A masking member made of a polymer alloy in accordance with claim 1, wherein said styrenic thermoplastic elastomer is styrene-hydrogenated polyolefin-styrene block copolymer.

7. A masking member made of a polymer alloy in accordance with claim 1, wherein the thickness of said sheet of said polymer alloy is from 0.1 to 1.5 mm.

8. A masking member in accordance with claim 2, wherein said engineering plastics is polyphenylene ether.

9. A masking member in accordance with claim 3, wherein said engineering plastics is polyphenylene ether.

10. A masking member in accordance with claim 2, wherein said polyamide is nylon 6.

11. A masking member in accordance with claim 3, wherein said polyamide is nylon 6.

12. A masking member in accordance with claim 4, wherein said polyamide is nylon 6.

13. A masking member made of a polymer alloy in accordance with claim 2, wherein said styrenic thermoplastic elastomer is styrene-hydrogenated polyolefin-styrene block copolymer.

14. A masking member made of a polymer alloy in accordance with claim 3, wherein said styrenic thermoplastic elastomer is styrene-hydrogenated polyolefin-styrene block copolymer.

15. A masking member made of a polymer alloy in accordance with claim 4, wherein said styrenic thermoplastic elastomer is styrene-hydrogenated polyolefin-styrene block copolymer.

16. A masking member made of a polymer alloy in accordance with claim 5, wherein said styrenic thermoplastic elastomer is styrene-hydrogenated polyolefin-styrene block copolymer.

* * * * *